(12) United States Patent
Venugopal et al.

(10) Patent No.: US 12,386,664 B2
(45) Date of Patent: Aug. 12, 2025

(54) DETERMINING OPTIMAL DATA ACCESS FOR DEEP LEARNING APPLICATIONS ON A CLUSTER

(71) Applicant: International Business Machines Corporation, Armonk, NY (US)

(72) Inventors: Srikumar Venugopal, Dublin (IE); Archit Patke, Champaign, IL (US); Ioannis Gkoufas, East Wall (IE); Christian Pinto, Dublin (IE); Panagiotis Koutsovasilis, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 17/305,735

(22) Filed: Jul. 14, 2021

(65) Prior Publication Data
US 2023/0014344 A1    Jan. 19, 2023

(51) Int. Cl.
G06F 9/50      (2006.01)
G06F 9/48      (2006.01)
G06F 18/214   (2023.01)

(52) U.S. Cl.
CPC .......... *G06F 9/5016* (2013.01); *G06F 9/4881* (2013.01); *G06F 9/5072* (2013.01); *G06F 18/214* (2023.01)

(58) Field of Classification Search
None
See application file for complete search history.

(56) References Cited

U.S. PATENT DOCUMENTS

| | | |
|---|---|---|
| 8,972,986 B2 | 3/2015 | Palanisamy |
| 9,811,384 B2 | 11/2017 | Caufield |
| 9,992,077 B2 | 6/2018 | Carlin |

(Continued)

FOREIGN PATENT DOCUMENTS

EP    3396545 A1    10/2018

OTHER PUBLICATIONS

"A Method and Apparatus for Online Application Placement in Hierarchical Cloud Computing Environments", An IP.com Prior Art Database Technical Disclosure, Disclosed Anonymously, IP.com No. IPCOM000241320D, IP.com Electronic Publication Date: Apr. 16, 2015, 5 pages.

(Continued)

*Primary Examiner* — Eric C Wai
(74) *Attorney, Agent, or Firm* — Daniel Yeates

(57) ABSTRACT

A computer-implemented method, a computer program product, and a computer system for determining optimal data access for deep learning applications on a cluster. A server determines candidate cache locations for one or more compute nodes in the cluster. The server fetches a mini-batch of a dataset located at a remote storage service into the candidate cache locations. The server collects information about time periods of completing a job on the one or more nodes, where the job is executed against fetched mini-batch at the candidate cache locations and the mini-batch at the remote storage location. The server selects, from the candidate cache locations and the remote storage location, a cache location. The server fetches the data of the dataset from the remote storage service to the cache location, and the one or more nodes execute the job against fetched data of the dataset at the cache location.

19 Claims, 8 Drawing Sheets

(56) References Cited

U.S. PATENT DOCUMENTS

| | | | |
|---|---|---|---|
| 10,326,649 | B2 | 6/2019 | Steinder |
| 11,055,225 | B2* | 7/2021 | Jalaparti ............. H04L 67/1097 |
| 2015/0189033 | A1* | 7/2015 | Han ..................... H04L 67/288 |
| | | | 709/203 |
| 2015/0379430 | A1 | 12/2015 | Dirac |
| 2016/0085587 | A1 | 3/2016 | Dube |
| 2019/0228303 | A1 | 7/2019 | Liu |
| 2020/0042362 | A1 | 2/2020 | Cui |
| 2020/0174840 | A1 | 6/2020 | Zhao |
| 2020/0344110 | A1* | 10/2020 | Chen ................... H04L 41/0803 |

OTHER PUBLICATIONS

"System and Method for Dynamic Application and Cluster Placement Policies", An IP.com Prior Art Database Technical Disclosure, Disclosed Anonymously, IP.com No. IPCOM000261104D, IP.com Electronic Publication Date: Jan. 29, 2020, 6 pages.

"System and method to optimize multicloud resources and policy preparations", An IP.com Prior Art Database Technical Disclosure, Disclosed Anonymously, IP.com No. IPCOM000263144D, IP.com Electronic Publication Date: Aug. 2, 2020, 6 pages.

Gu, et al., "Tiresias: A GPU Cluster Manager for Distributed Deep Learning", Proceedings of the 16th USENIX Symposium on Networked Systems Design and Implementation (NSDI '19), 2019, 17 pages, <www.usenix.org/conference/nsdi19/presentation/gu>.

Kumar, et al., "Quiver: An Informed Storage Cache for Deep Learning", Proceedings of the 18th USENIX Conference on File and Storage Technologies (FAST '20), 2020, 15 pages, <www.usenix.org/conference/fast20/presentation/kumar>.

Mell, et al., "The NIST Definition of Cloud Computing", National Institute of Standards and Technology, Special Publication 800-145, Sep. 2011, 7 pages.

Mittal, et al., "A Survey of Deep Learning on CPUs: Opportunities and Co-optimizations", Preprint Feb. 2020, 55 pages, <www.researchgate.net/publication/339029465_A_Survey_of_Deep_Learning_on_CPUs_Opportunities_and_Co-optimizations>.

Pinto, et al., "Hoard: a Distributed Data Caching System to Accelerate Deep Learning Training on the Cloud", arXiv:1812.00669v1, Dec. 3, 2018, 12 pages, <arxiv.org/pdf/1812.00669.pdf>.

Tian, et al., "DeepCluster: A General Clustering Framework based on Deep Learning", Joint European Conference on Machine Learning and Knowledge Discovery in Databases, 2017, 16 pages.

Xiao, et al., "Gandiva: Introspective Cluster Scheduling for Deep Learning", Proceedings of the 13th USENIX Symposium on Operating Systems Design and Implementation (OSDI '18), 2018, 17 pages, <www.usenix.org/conference/osdi18/presentation/xiao>.

* cited by examiner

DETERMINING OPTIMAL DATA ACCESS FOR DEEP LEARNING APPLICATIONS ON A CLUSTER

BACKGROUND

The present invention relates generally to accelerating performance of training deep learning models, and more particularly to determining optimal data access for deep learning applications on a cluster.

Training large neural networks or so-called deep neural networks is performed on compute clusters endowed with central processing units (CPUs) and graphics processing units (GPUs), and it requires an enormous amount of data as input. Current sizes of input datasets start from 100 gigabytes and go up to terabytes. In many systems, data is kept offsite in a storage area network (SAN) or in remote cloud object storage and is fetched when required for training jobs. Recent advances have attempted to cache this training data to avoid wastage of compute resources while waiting for the data to arrive.

Deep learning is a technological breakthrough in machine learning that enables features to be extracted at higher efficiency from large volumes of data. Deep learning has applications in domains such as image classification, speech translation, object detection, and document extraction. However, training deep learning networks requires massive datasets, and it involves heavy use of compute, storage, and network resources. This has significant impact on data centers that are shared infrastructures between multiple users.

Currently, users store large volumes of data in object storage services that are offered by all major cloud providers. The object storage services offer inexpensive storage that is accessible through web interface and application programming interfaces. In other cases, such as in high performance computing (HPC) installations, data may be stored on storage area networks (SANs), external to compute infrastructures. In either case, there is a performance overhead as well as expense associated with accessing such remote storage services.

Recent research has focused on caching this data, either partially or completely, in compute infrastructures. However, storage space in compute clusters are limited. Therefore, it is not possible to cache the data for every training job.

SUMMARY

In one aspect, a computer-implemented method for determining optimal data access for deep learning applications on a cluster is provided. The computer-implemented method includes determining candidate cache locations for one or more compute nodes in the cluster. The computer-implemented method further includes fetching a mini-batch of a dataset located at a remote storage service into the candidate cache locations. The computer-implemented method further includes collecting information about time periods of completing a job on the one or more compute nodes, where the job is executed against fetched mini-batch at the candidate cache locations and the mini-batch at the remote storage location. The computer-implemented method further includes selecting, from the candidate cache locations and the remote storage location, a cache location for fetching data of the dataset, based on the information about the time periods of completing the job. The computer-implemented method further includes fetching the data of the dataset from the remote storage service to the cache location, where the one or more compute nodes execute the job against fetched data of the dataset at the cache location.

In another aspect, a computer program product for determining optimal data access for deep learning applications on a cluster is provided. The computer program product comprises a computer readable storage medium having program instructions embodied therewith, and the program instructions are executable by one or more processors. The program instructions are executable to: determine candidate cache locations for one or more compute nodes in the cluster; fetch a mini-batch of a dataset located at a remote storage service into the candidate cache locations; collect information about time periods of completing a job on the one or more compute nodes, where the job is executed against fetched mini-batch at the candidate cache locations and the mini-batch at the remote storage location; select, from the candidate cache locations and the remote storage location, a cache location for fetching data of the dataset, based on the information about the time periods of completing the job; fetch the data of the dataset from the remote storage service to the cache location, wherein the one or more compute nodes execute the job against fetched data of the dataset at the cache location.

In yet another aspect, a computer system for determining optimal data access for deep learning applications on a cluster is provided. The computer system comprises one or more processors, one or more computer readable tangible storage devices, and program instructions stored on at least one of the one or more computer readable tangible storage devices for execution by at least one of the one or more processors. The program instructions are executable to determine candidate cache locations for one or more compute nodes in the cluster. The program instructions are further executable to fetch a mini-batch of a dataset located at a remote storage service into the candidate cache locations. The program instructions are further executable to collect information about time periods of completing a job on the one or more compute nodes, the job is executed against fetched mini-batch at the candidate cache locations and the mini-batch at the remote storage location. The program instructions are further executable to select, from the candidate cache locations and the remote storage location, a cache location for fetching data of the dataset, based on the information about the time periods of completing the job. The program instructions are further executable to fetch the data of the dataset from the remote storage service to the cache location. In the computer system, the one or more compute nodes execute the job against fetched data of the dataset at the cache location.

DETAILED DESCRIPTION

Figure 1:
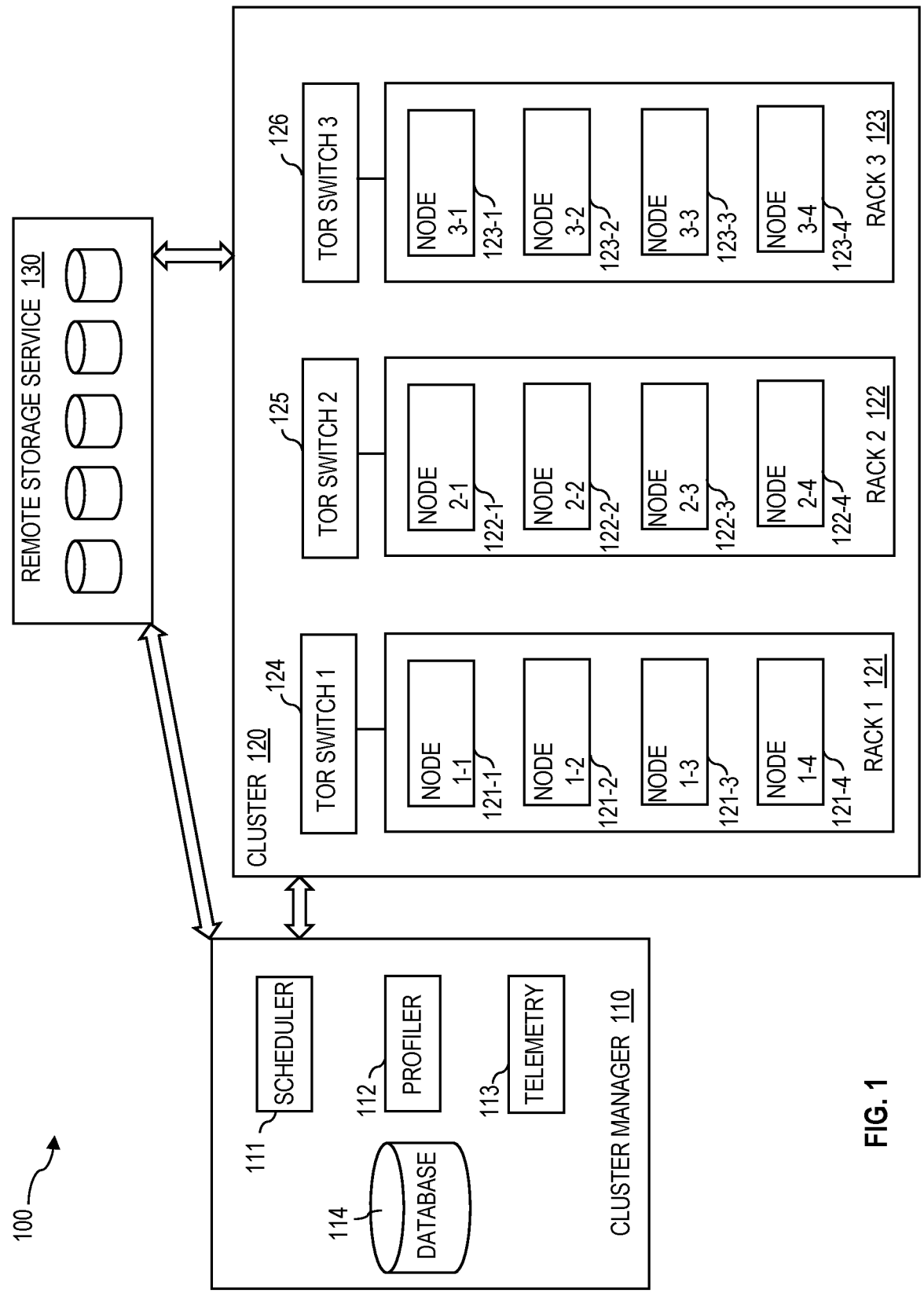
FIG. 1 is a systematic diagram illustrating a system of data access for deep learning applications on a cluster, in accordance with one embodiment of the present invention.

FIG. 1 is a systematic diagram illustrating system 100 of data access for deep learning applications on a cluster, in accordance with one embodiment of the present invention. System 100 includes cluster 120. Cluster 120 is a networked system of individual machines. Each machine has at least a processor, memory, and attached storage. Such a machine is described in more detail in later paragraphs with reference to FIG. 6. Some machines may have additional components such as GPUs (graphics processing units) and accelerators. Machines are organized into racks; in an example shown in FIG. 1, machines in cluster 120 are organized into rack 1 121, rack 2 122, and rack 3 123. Each rack includes multiple machines as nodes in the networked system. For example, rack 1 121 includes node 1-1 121-1, node 1-2 121-2, node 1-3 121-3, and node 1-4 121-4; rack 2 122 includes node 2-1 122-1, node 2-2 122-2, node 2-3 122-3, and node 2-4 122-4; rack 3 123 includes node 3-1 123-1, node 3-2 123-2, node 3-3 123-3, and node 3-4 123-4. All the machines in a rack are connected to a top of rack (ToR) switch. For example, the machines (nodes) in rack 1 121 are connected to ToR switch 1 124, the machines (nodes) in rack 2 122 are connected to ToR switch 2 125, and the machines (nodes) in rack 3 123 are connected to ToR switch 3 126. Racks (such as rack 1 121, rack 2 122, and rack 3 123) are connected to each other in various topologies or network architectures.

System 100 further includes cluster manager 110. Cluster manager 110 may be implemented on a server. A server is described in more detail in later paragraphs with reference to FIG. 6. Cluster manager 110 includes scheduler 111. Scheduler 111 assigns jobs to compute and storage resources. In embodiments of the present invention, the jobs are training of deep learning neural networks. In some embodiments, there can be multiple schedulers in a cluster manager. Cluster manager 110 further includes profiler 112. Profiler 112 probes the cache and storage locations to determine the effect of data transfer on job performance. Cluster manager 110 further includes telemetry 113. Telemetry 113 monitors resource and network performance. Intra-cluster network monitoring is setup to measure bandwidth (via link utilization) and latency (via pings) between compute nodes. Inter-cluster network monitoring is also setup to measure bandwidth and latency to the remote cloud object store. Cluster manager 110 further includes database 114 which keeps track of the history of various scheduling decisions and also keeps track of cluster node and network performance data.

System 100 further includes remote storage service 130 which is a service outside of cluster 120. Remote storage service 130 stores data and serves cluster 120 through a network. In some embodiments, remote storage service 130 may be an object storage service that stores data as objects instead of files. The nature of the storage service permits large amounts of data to be stored.

Cluster manager 110, cluster 120 (including compute nodes), and remote storage service 130 are connected by a network. The network can be any combination of connections and protocols which support communications among one or more computing devices or servers. For example, the network may be the Internet which represents a worldwide collection of networks and gateways to support communications between devices connected to the Internet; the network may be implemented as an intranet, a local area network (LAN), a wide area network (WAN), and a wireless network. System 100 may be implemented in a cloud computing environment. The cloud computing environment is described in more detail in later paragraphs with reference to FIG. 7 and FIG. 8.

Figure 2:
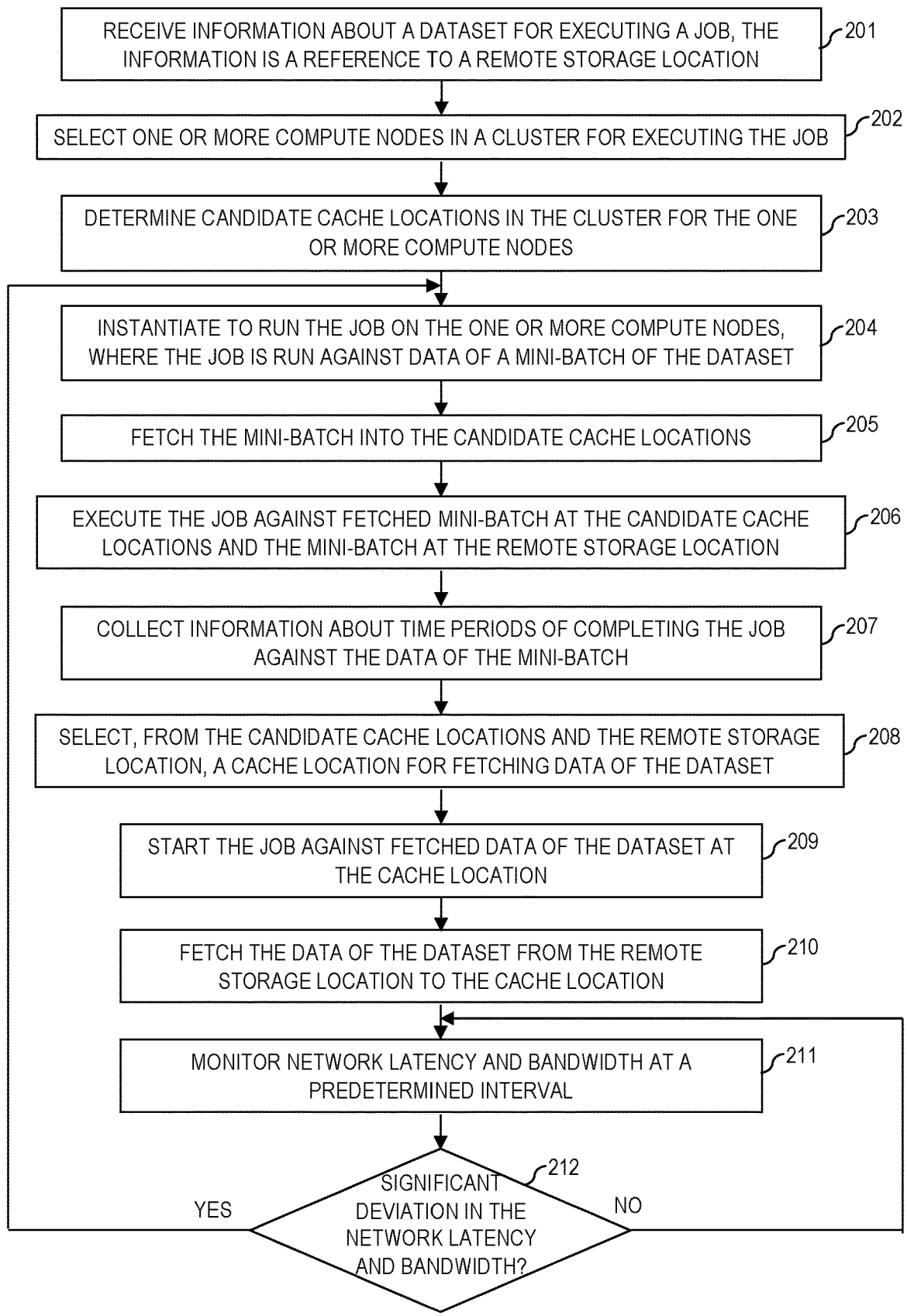
FIG. 2 presents a flowchart showing operational steps of determining optimal data access for deep learning applications on a cluster, in accordance with one embodiment of the present invention.
Figure 3:
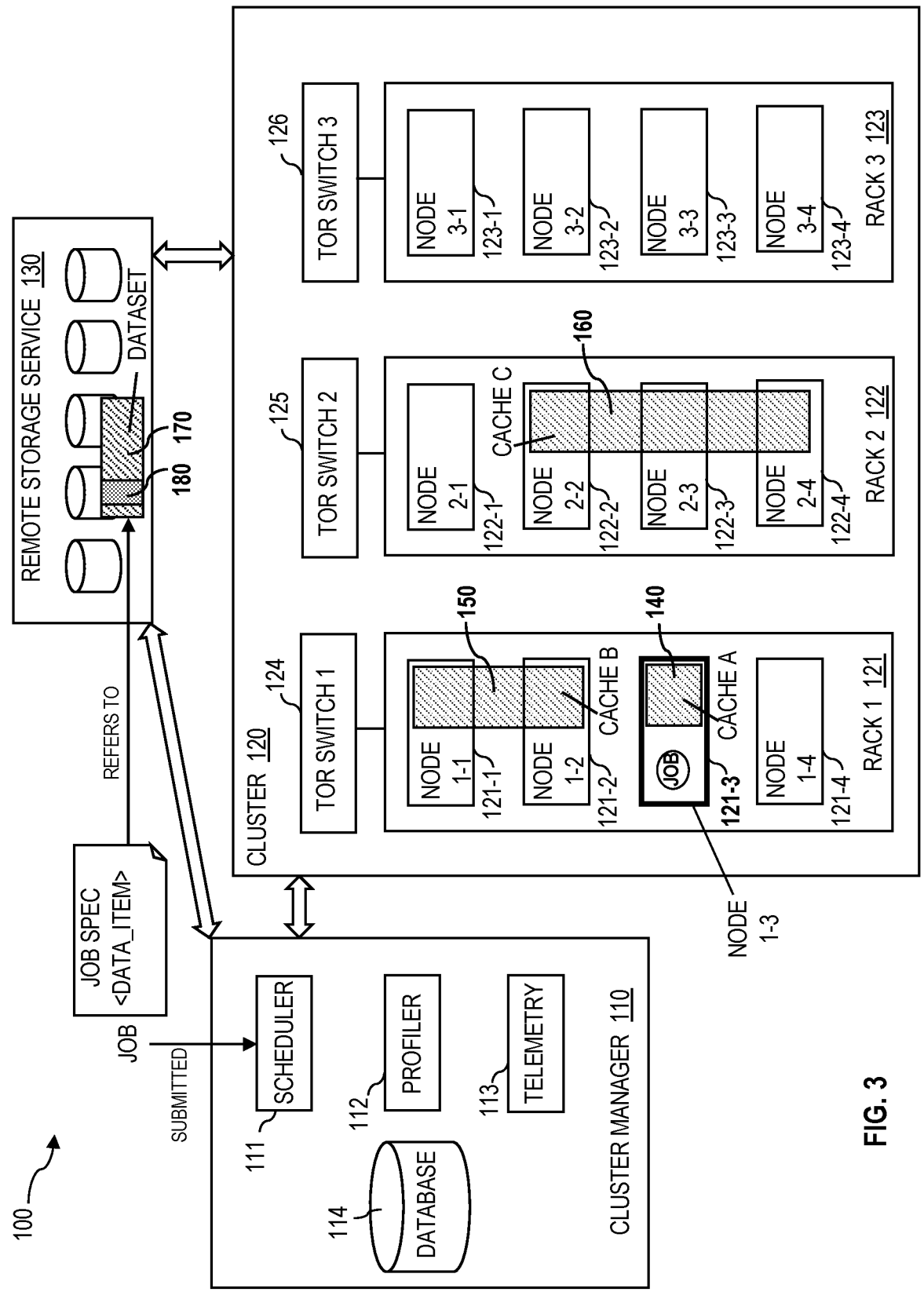
FIG. 3, FIG. 4, and FIG. 5 illustrate the operational steps shown in FIG. 2, in accordance with one embodiment of the present invention.

FIG. 2 presents a flowchart showing operational steps of determining optimal data access for deep learning applications on a cluster, in accordance with one embodiment of the present invention. At step 201, a cluster manager receives information about a dataset for executing a job. The job is a unit of work to be executed in a cluster. In this disclosure, jobs are specifically, but not limited to, training of deep learning neural networks. The job definition includes the executable, its parameters, and the input data. Generally, neural network training requires datasets sized more than hundreds of gigabytes, and the datasets are generally stored outside of the cluster in an object storage service. The information about the dataset is a reference to its canonical storage location, i.e., the remote storage service. As shown in FIG. 3, a job specification including the information of the dataset is submitted to scheduler 111 in cluster manager 110. The dataset information is a reference to dataset 170 at remote storage service 130.

At step 202, the cluster manager selects one or more compute nodes in the cluster for executing the job. Selecting the one or more compute nodes is based on certain constraints such as availability of CPUs or other accelerators. As shown in FIG. 3, scheduler 111 in cluster manager 110 selects node 1-3 121-3 in rack 1 121 of cluster 120 to execute the job.

At step 203, the cluster manager determines candidate cache locations in the cluster for the one or more compute nodes. The candidate cache locations with respect to the selected one or more compute nodes are node-local, rack-local, cluster-local, and remote storage. A cache is a storage area in the cluster that retains data obtained from the remote storage service. The node-local cache is a cache situated on the same node where the job is executed. The rack-local cache is a cache located in the same rack but not the same node where the job is executed. The cluster-local cache is a cache located in the same cluster but not in the same rack where the job is executed. Remote storage is remote cloud object storage (remote storage service) located outside the cluster. If any of these cache locations is not already present, the cluster manager will create one. The mini-batch is a sample of the dataset located at the remote storage service.

As shown in FIG. 3, scheduler 111 in cluster manager 110 determines following candidate cache locations: cache A 140 as a node-local cache located at node 1-3 121-3 where the job is executed, cache B 150 as a rack-local cache located at node 1-1 121-1 and node 1-2 121-2 in rack 1 121 (the same rack), cache C 160 as a cluster-local cache located in rack 2 122 of cluster 120 (the same cluster), and remote storage service 130. FIG. 3 also shows mini-batch 180 which is a sample of dataset 170 located in remote storage service 130.

Figure 4:
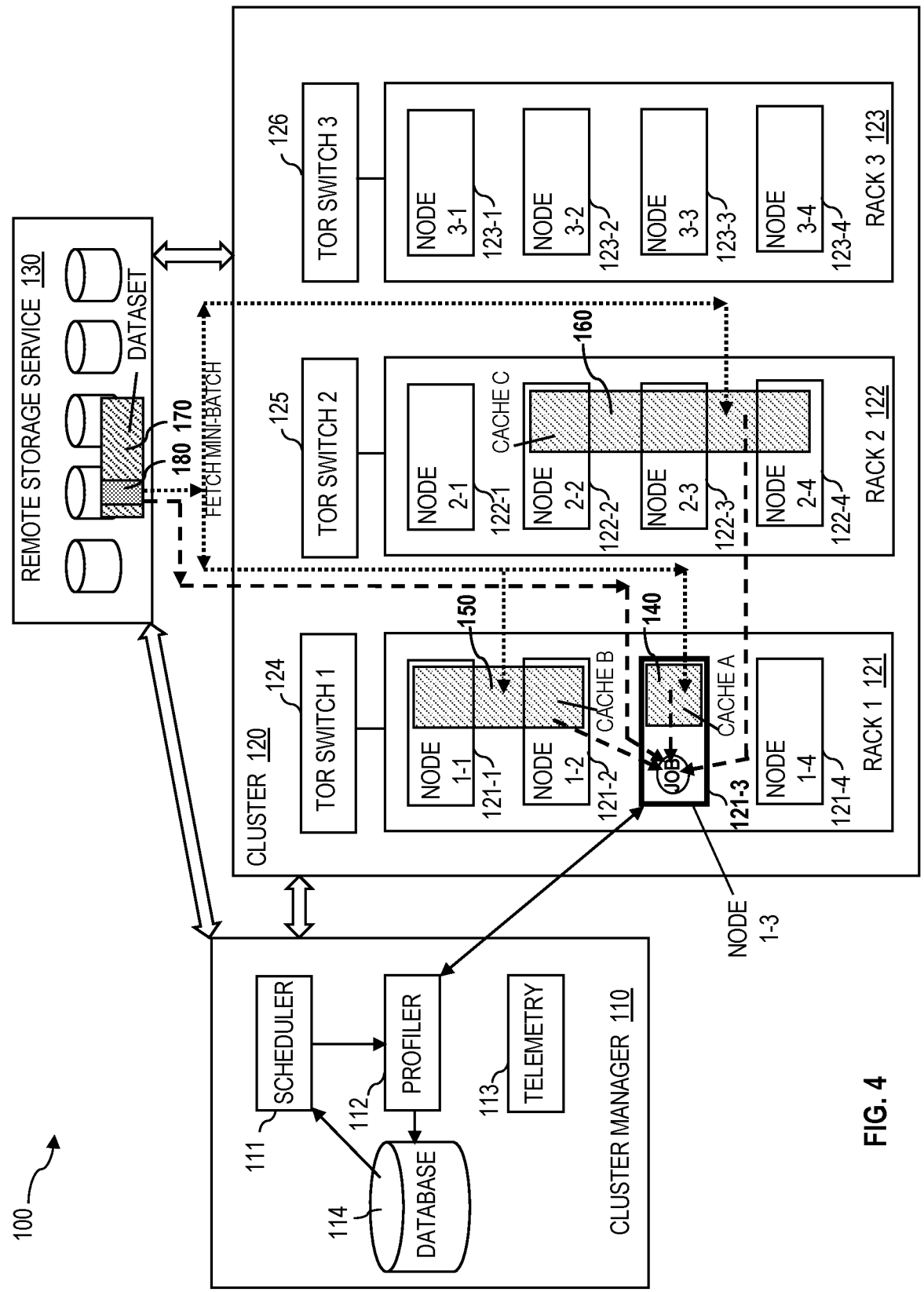

At step 204, the cluster manager instantiates to run the job on the one or more compute nodes, where the job is run against data of a mini-batch of the dataset. Shown in FIG. 4, scheduler 111 in cluster manager 110 instantiates profiler 112 which runs the job on node 1-3 121-3, where the job accesses mini-batch 180 as input data. At step 205, the cluster manager fetches the mini-batch into the candidate cache locations. As shown by dotted lines in FIG. 4, mini-batch 180 is fetched into cache A 140, cache B 150, and cache C 160.

At step 206, the one or more compute nodes execute the job against fetched mini-batch at the candidate cache locations and the mini-batch at the remote storage location. The fetched mini-batch at the candidate cache locations and the mini-batch at the remote storage location are used in turn by the job. As shown by dashed lines in FIG. 4, the fetched mini-batch at cache A 140, cache B 150, cache C 160 is accessed by the job; mini-batch 180 at remote storage service 130 is also accessed by the job.

At step 207, the cluster manager collects information about time periods of completing the job against the data of the mini-batch. For using the different candidate cache locations and the remote storage location, the execution of the job may take different time periods to complete, and the execution of the job may also take the same time period (i.e., the execution of the job may be indifferent to locations of the data). The information about the time periods of completing the job may be used to evaluate which one of the candidate cache locations and the remote storage location provides optimal data access for executing the job. In the embodiment shown in FIG. 4, the information about the time periods is collected by profiler 112 of cluster manager 110; the profiler 112 enters the information about the time periods into database 114. The information stored in database 114 will be used by scheduler 111 to evaluate optimal data access for executing the job.

At step 208, the cluster manager selects, from the candidate cache locations and the remote storage location, a cache location for fetching data of the dataset. Selecting the cache location for fetching the dataset is based on the information about the time periods of completing the job. Intuitively, it may seem that the best decision is to cache the data on a compute node where the job is allocated to execute; however, this ignores many factors such as the job being distributed over multiple machines, storage limitations of the target compute machine, resources shared between multiple jobs (for a virtualized environment), variations in network traffic, etc. In the embodiment shown in FIG. 5, scheduler 111 reads the job execution data (the time periods of completing the job) from database 114 and selects cache A 140 as the cache location for fetching the data of the dataset. In response to determining that the execution of the job takes the same time period, the cluster manager (for example, scheduler 111) determines not to cache the data.

Figure 5:
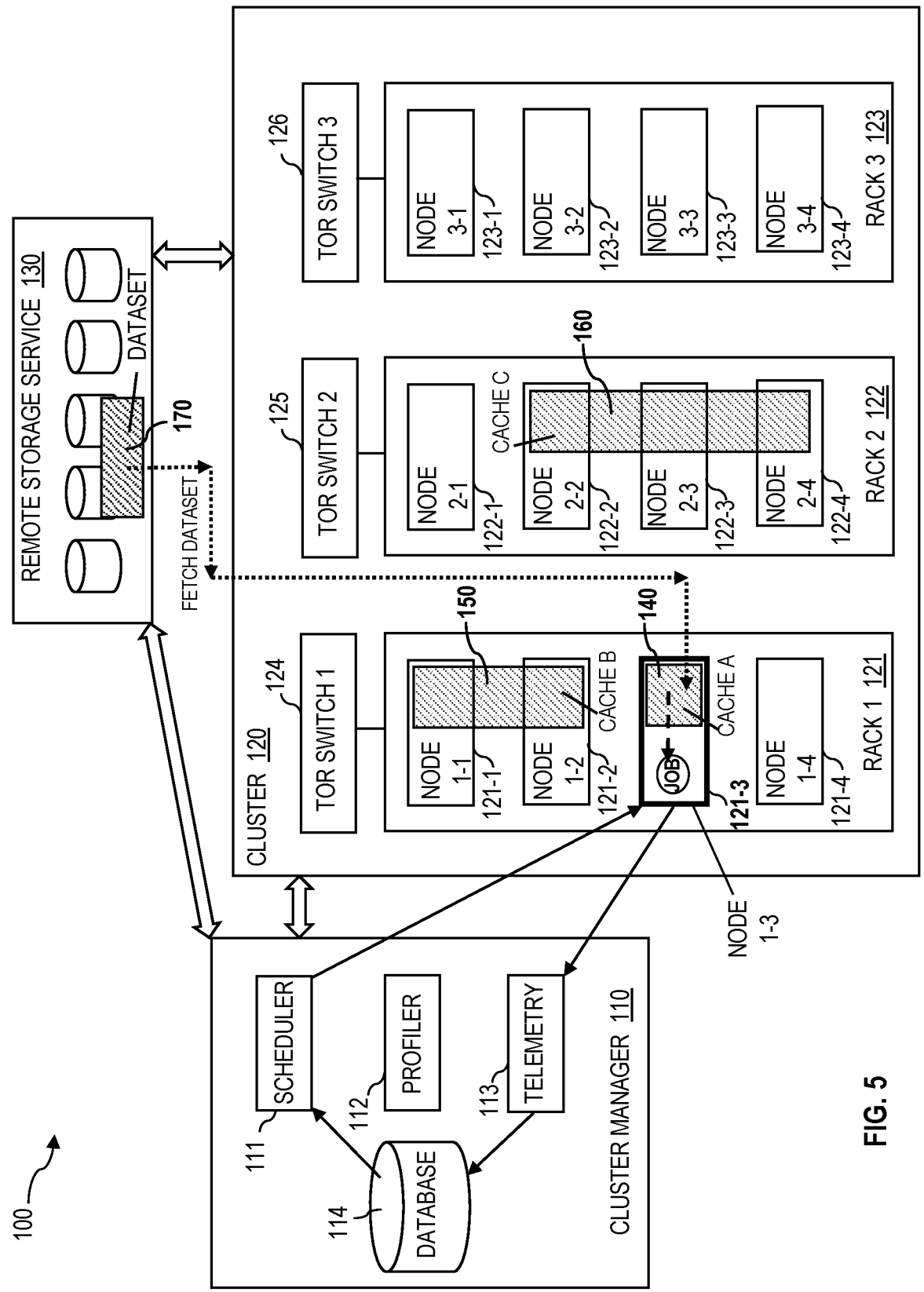

At step 209, the cluster manager starts the job on the one or more computer nodes, where the job is executed against fetched data of the dataset at the cache location selected at step 208. The cluster manager may instruct the one or more compute nodes to execute the job against the fetched data the dataset at the cache location selected. While the one or more compute nodes execute the job, the cluster manager at step 210 fetches the data of the dataset from the remote storage service to the cache location. In the embodiment shown in FIG. 5, cluster manager 110 fetches the data of dataset 170 from remote storage service 130 to cache A 140. In FIG. 5, the dotted line indicates fetching the data of dataset 170 from remote storage service 130 to cache A 140; the dashed line indicates that node 1-3 121-3 executes the job against the data fetched to cache A 140.

At step 211, the cluster manager monitors network latency and bandwidth, at a predetermined interval. While the one or more compute nodes execute the job, the cluster manager monitors the latency and bandwidth in a network linking the one or more compute nodes, the cache location, and the remote storage service. The cluster manager stores the measurement data of the network latency and bandwidth on a database. In the embodiment shown in FIG. 5, telemetry 113 of cluster manager 110 monitors the latency and bandwidth in a network linking node 1-3 121-3 and remote storage service 130, and telemetry 113 stores the measurement data of the network latency and bandwidth on database 114.

At step 212, the cluster manager determines whether significant deviation in the network latency and bandwidth occurs. In determining whether the significant deviation occurs, the cluster manager determines whether the deviation in the network latency and bandwidth exceeds a predetermined threshold. In the embodiment shown in FIG. 5, scheduler 111 of cluster manager 110 determines whether significant deviation in the network latency and bandwidth occurs, based on the measurement data of the network latency and bandwidth stored on database 114.

In response to determining that the significant deviation in the network latency and bandwidth occurs (YES branch of decision block 212), the cluster manager iterates step 204. In the embodiment shown in FIG. 4 and FIG. 5, scheduler 111 in cluster manager 110 re-instantiates profiler 112 which runs the job on node 1-3 121-3 using data of mini-batch 180 as input data. After the job is run with the mini-batch, the cluster manager may make a new selection from the candidate cache locations and the remote storage location. In response to determining that the significant deviation in the network latency and bandwidth does not occur (NO branch of decision block 212), the cluster manager iterates step 211, continuing to monitor the network latency and bandwidth.

The selected cache location at step 208 may be used for subsequent executions of other submitted jobs that required the same dataset. When a new job is submitted, the cluster manager (for example, scheduler 111 of cluster manager 110 shown in FIG. 1) may refer to a database (for example, database 114 of cluster manager 110 shown in FIG. 1) for a combination of compute nodes and cache locations. In this case, the cluster manager may choose to not run a profiling job in the interest of conserving resources.

Figure 6:
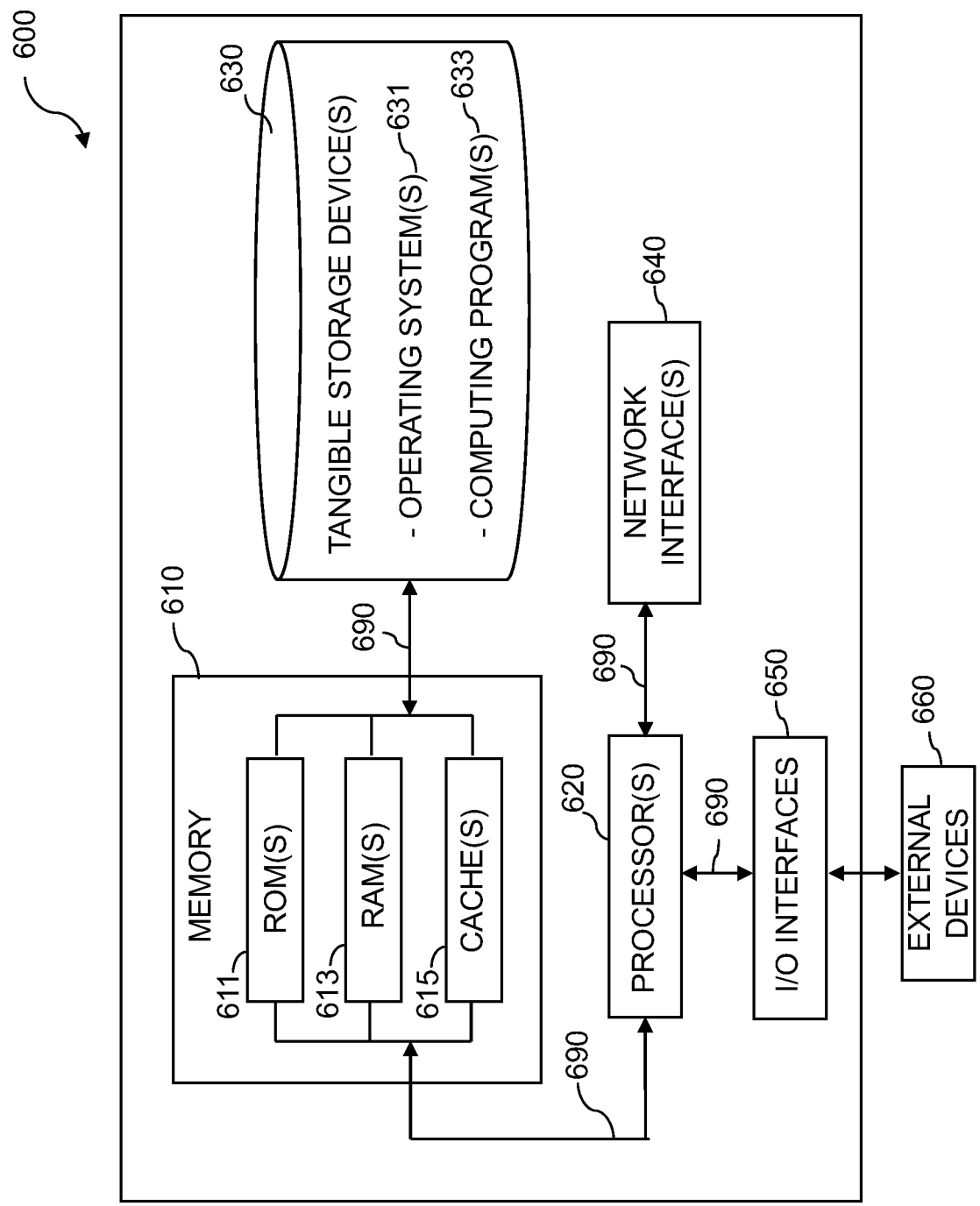
FIG. 6 is a diagram illustrating components of a computing device or server, in accordance with one embodiment of the present invention.

FIG. 6 is a diagram illustrating components of computing device or server 600, in accordance with one embodiment of the present invention. It should be appreciated that FIG. 6 provides only an illustration of one implementation and does not imply any limitations with regard to the environment in which different embodiments may be implemented.

Referring to FIG. 6, computing device or server 600 includes processor(s) 620, memory 610, and tangible storage device(s) 630. In FIG. 6, communications among the above-mentioned components of computing device or server 600 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630.

Computing device or server 600 further includes I/O interface(s) 650. I/O interface(s) 650 allows for input and output of data with external device(s) 660 that may be connected to computing device or server 600. Computing device or server 600 further includes network interface(s) 640 for communications between computing device or server 600 and a computer network.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
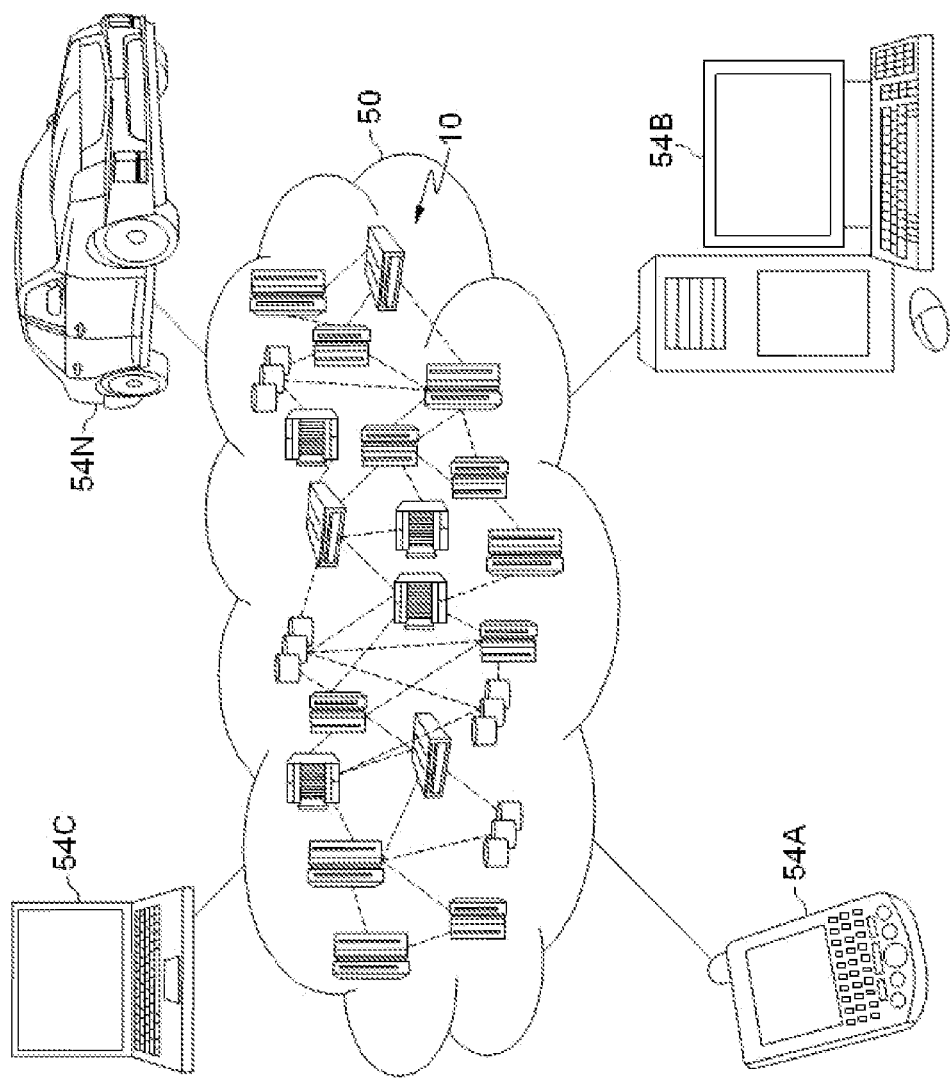
FIG. 7 depicts a cloud computing environment, in accordance with one embodiment of the present invention.

Referring now to FIG. 7, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 8:
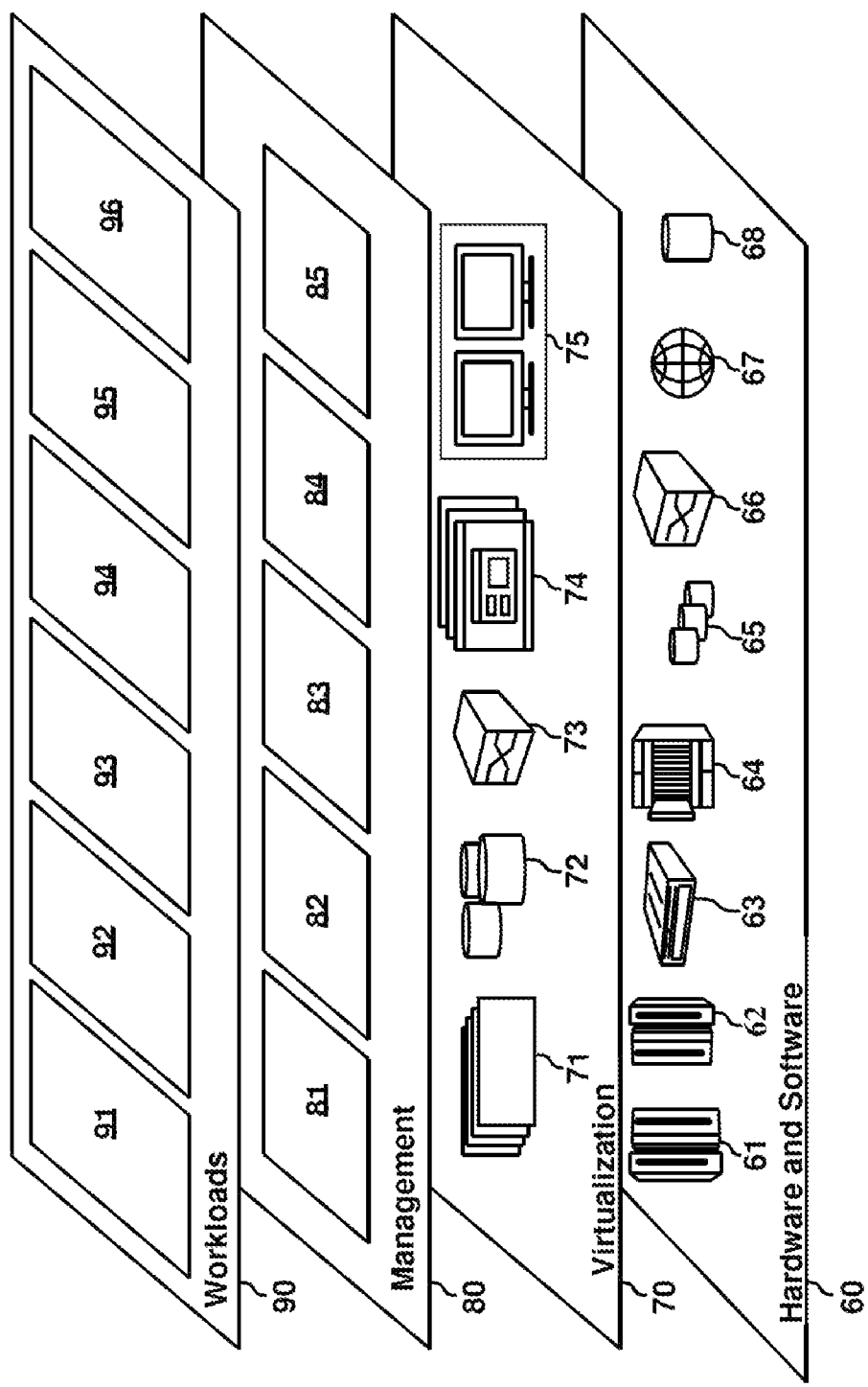
FIG. 8 depicts abstraction model layers in a cloud computing environment, in accordance with one embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of determining optimal data access for deep learning applications on a cluster.

What is claimed is:

1. A computer-implemented method for determining optimal data access for deep learning applications on a cluster, the computer-implemented method comprising:
    determining candidate cache locations for two or more compute nodes in the cluster;
    fetching a mini-batch of a dataset located at a remote storage service into the candidate cache locations, wherein the mini-batch is a sample of the dataset;
    collecting information about time periods of completing a job on the two or more compute nodes, where the job is executed against fetched mini-batch at the candidate cache locations and the mini-batch at the remote storage location;
    selecting, based on the collecting information and from the candidate cache locations and the remote storage location, a cache location for fetching data of the dataset, based on the information about the time periods of completing the job;
    fetching the data of the dataset from the remote storage service to the cache location; and
    wherein the two or more compute nodes execute the job against fetched data of the dataset at the cache location.

2. The computer-implemented method of claim 1, further comprising:
    receiving information about the dataset for executing the job, the information about the dataset being a reference to the remote storage location; and
    selecting the compute node in the cluster for executing the job.

3. The computer-implemented method of claim 1, further comprising:
    instantiating to run the job on the two or more compute nodes, wherein the job is run against data of the mini-batch.

4. The computer-implemented method of claim 1, further comprising:
    instructing the two or more compute nodes to execute the job against the fetched data of the dataset at the cache location.

5. The computer-implemented method of claim 1, further comprising:
    monitoring network latency and bandwidth, at a predetermined interval, while the two or more compute nodes executing the job against the fetched data of the dataset at the cache location; and
    determining whether significant deviation in the network latency and bandwidth occurs;
    in response to determining that the significant deviation in the network latency and bandwidth occurs, re-instantiating to run the job against data of the mini-batch, and making a new selection from the candidate cache locations and the remote storage location.

6. The computer-implemented method of claim 1, wherein the candidate cache locations include one or more node-local locations that are situated on the two or more compute nodes, wherein the candidate cache locations further include one or more rack-local locations that are situated in a rack of the two or more compute nodes but not on the two or more compute nodes, wherein the candidate cache locations further include two or more cluster-local locations that are situated in the cluster but not in the rack of the two or more compute nodes.

7. The computer-implemented method of claim 1, wherein the job is training a deep learning model.

8. A computer program product for determining optimal data access for deep learning applications on a cluster, the computer program product comprising a computer readable storage medium having program instructions embodied therewith, the program instructions executable by one or more processors, the program instructions executable to:
    determine candidate cache locations for two or more compute nodes in the cluster;
    fetch a mini-batch of a dataset located at a remote storage service into the candidate cache locations, wherein the mini-batch is a sample of the dataset;
    collect information about time periods of completing a job on the two or more compute nodes, wherein the job is executed against fetched mini-batch at the candidate cache locations and the mini-batch at the remote storage location;
    select, based on the collecting of information and from the candidate cache locations and the remote storage location, a cache location for fetching data of the dataset, based on the information about the time periods of completing the job;
    fetch the data of the dataset from the remote storage service to the cache location; and
    wherein the two or more compute nodes execute the job against fetched data of the dataset at the cache location.

9. The computer program product of claim 8, further comprising the program instructions executable to:
    receive information about the dataset for executing the job, the information about the dataset being a reference to the remote storage location; and
    select the two or more compute nodes in the cluster for executing the job.

10. The computer program product of claim 8, further comprising the program instructions executable to:
    instantiate to run the job on the two or more compute nodes, wherein the job is run against data of the mini-batch.

11. The computer program product of claim 8, further comprising the program instructions executable to:
    instruct the two or more compute nodes to execute the job against the fetched data of the dataset at the cache location.

12. The computer program product of claim 8, further comprising the program instructions executable to:
monitor network latency and bandwidth, at a predetermined interval, while the two or more compute nodes executing the job against the fetched data of the dataset at the cache location; and
determine whether significant deviation in the network latency and bandwidth occurs;
in response to determining that the significant deviation in the network latency and bandwidth occurs, re-instantiate to run the job against data of the mini-batch, and make a new selection from the candidate cache locations and the remote storage location.

13. The computer program product of claim 8, wherein the candidate cache locations include one or more node-local locations that are situated on the two or more compute nodes, wherein the candidate cache locations further include one or more rack-local locations that are situated in a rack of the two or more compute nodes but not on the two or more compute nodes, wherein the candidate cache locations further include one or more cluster-local locations that are situated in the cluster but not in the rack of the two or more compute nodes.

14. The computer program product of claim 8, wherein the job is training a deep learning model.

15. A computer system for determining optimal data access for deep learning applications on a cluster, the computer system comprising one or more processors, one or more computer readable tangible storage devices, and program instructions stored on at least one of the one or more computer readable tangible storage devices for execution by at least one of the one or more processors, the program instructions executable to:
determine candidate cache locations for one or more compute nodes in the cluster, wherein the candidate cache locations include one or more node-local locations that are situated on the one or more compute nodes, wherein the candidate cache locations further include one or more rack-local locations that are situated in a rack of the one or more compute nodes but not on the one or more compute nodes, wherein the candidate cache locations further include one or more cluster-local locations that are situated in the cluster but not in the rack of the one or more compute nodes;
fetch a mini-batch of a dataset located at a remote storage service into the candidate cache locations, wherein the mini-batch is a sample of the dataset;
collect information about time periods of completing a job on the one or more compute nodes, wherein the job is executed against fetched mini-batch at the candidate cache locations and the mini-batch at the remote storage location;
select, from the candidate cache locations and the remote storage location, a cache location for fetching data of the dataset, based on the information about the time periods of completing the job;
fetch the data of the dataset from the remote storage service to the cache location; and
wherein the one or more compute nodes execute the job against fetched data of the dataset at the cache location.

16. The computer system of claim 15, further comprising the program instructions executable to:
receive information about the dataset for executing the job, the information about the dataset being a reference to the remote storage location; and
select the one or more compute nodes in the cluster for executing the job.

17. The computer system of claim 15, further comprising the program instructions executable to:
instantiate to run the job on the one or more compute nodes, wherein the job is run against data of the mini-batch.

18. The computer system of claim 15, further comprising the program instructions executable to:
instruct the one or more compute nodes to execute the job against the fetched data of the dataset at the cache location.

19. The computer system of claim 15, further comprising the program instructions executable to:
monitor network latency and bandwidth, at a predetermined interval, while the one or more compute nodes executing the job against the fetched data of the dataset at the cache location; and
determine whether significant deviation in the network latency and bandwidth occurs;
in response to determining that the significant deviation in the network latency and bandwidth occurs, re-instantiate to run the job against data of the mini-batch, and make a new selection from the candidate cache locations and the remote storage location.

* * * * *